(12) United States Patent
Lee et al.

(10) Patent No.: US 12,536,668 B2
(45) Date of Patent: Jan. 27, 2026

(54) VEHICLE AND METHOD OF CONTROLLING THE SAME

(71) Applicants: Hyundai Motor Company, Seoul (KR); Kia Corporation, Seoul (KR)

(72) Inventors: Hayeon Lee, Gwacheon-Si (KR); Deuk Hyeon Kim, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 387 days.

(21) Appl. No.: 18/179,513

(22) Filed: Mar. 7, 2023

(65) Prior Publication Data

US 2023/0410318 A1    Dec. 21, 2023

(30) Foreign Application Priority Data

May 19, 2022    (KR) .......................... 10-2022-0061399

(51) Int. Cl.
| | |
|---|---|
| *G06T 7/12* | (2017.01) |
| *B60R 1/12* | (2006.01) |
| *G06T 3/40* | (2024.01) |
| *G06T 5/70* | (2024.01) |
| *G06V 20/58* | (2022.01) |

(52) U.S. Cl.
CPC .................. *G06T 7/12* (2017.01); *G06T 3/40* (2013.01); *G06T 5/70* (2024.01); *G06V 20/58* (2022.01); *B60R 1/12* (2013.01); *B60R 2001/1223* (2013.01); *G06T 2207/20021* (2013.01); *G06T 2207/20192* (2013.01); *G06T 2207/30252* (2013.01)

(58) Field of Classification Search
None
See application file for complete search history.

(56) References Cited

U.S. PATENT DOCUMENTS

| | | | |
|---|---|---|---|
| 8,670,034 B2 | 3/2014 | Hattori et al. | |
| 10,291,846 B2 | 5/2019 | Liepelt et al. | |
| 10,497,107 B1* | 12/2019 | Lérant | ........................ G06T 5/50 |
| 10,742,851 B2 | 8/2020 | Yamashita et al. | |

(Continued)

FOREIGN PATENT DOCUMENTS

| | | |
|---|---|---|
| JP | 2004194071 A | 7/2004 |
| JP | 2012247847 A | 12/2012 |

(Continued)

*Primary Examiner* — Randolph I Chu
(74) *Attorney, Agent, or Firm* — Banner & Witcoff, Ltd.

(57) ABSTRACT

Disclosed are apparatus and method for determining a mask region for a side field of view of a vehicle. A vehicle may include an image capturing device configured to acquire a plurality of images associated with a side field of view of the vehicle. The vehicle may generate, based on accumulated edge values, a first map and generate, based on accumulated brightness difference values, a second map, wherein the accumulated edge values and the accumulated brightness difference values are obtained by processing the plurality of images; determine a boundary between a vehicle region and a detection region in the side field of view based on: at least one first value for at least one pixel of the first map; and at least one second value for at least one pixel of the second map; and determine, based on the determined boundary, a mask region of the side field of view.

20 Claims, 16 Drawing Sheets

(56) References Cited

U.S. PATENT DOCUMENTS

| | | | | |
|---|---|---|---|---|
| 2007/0263256 | A1* | 11/2007 | Sakaue | H04N 1/40062 358/1.9 |
| 2010/0245578 | A1* | 9/2010 | Kakinami | G06V 20/586 348/148 |
| 2011/0216938 | A1* | 9/2011 | Suzuki | G06V 10/48 382/103 |
| 2013/0027511 | A1* | 1/2013 | Takemura | G06V 20/588 348/42 |
| 2013/0241412 | A1* | 9/2013 | Ooba | B60Q 1/04 315/82 |
| 2014/0009615 | A1* | 1/2014 | Kiyohara | G06V 20/588 348/148 |
| 2014/0010408 | A1* | 1/2014 | Irie | G06T 7/0002 382/103 |
| 2014/0029008 | A1* | 1/2014 | Hirai | G06V 20/56 356/445 |
| 2015/0015384 | A1* | 1/2015 | Shima | B60W 40/04 340/435 |
| 2015/0177512 | A1* | 6/2015 | Hayakawa | G02B 27/0006 348/148 |
| 2015/0194057 | A1* | 7/2015 | Jin | B60W 30/0956 348/148 |
| 2015/0323785 | A1* | 11/2015 | Fukata | H04N 7/18 348/148 |
| 2018/0025508 | A1* | 1/2018 | Lee | G06T 7/73 382/154 |
| 2019/0118712 | A1* | 4/2019 | Shigemura | H04N 7/18 |
| 2019/0156129 | A1* | 5/2019 | Kakegawa | G08G 1/16 |
| 2019/0258251 | A1* | 8/2019 | Ditty | G06F 15/7807 |
| 2020/0356792 | A1* | 11/2020 | Miyashita | G06V 20/586 |
| 2020/0410257 | A1* | 12/2020 | Machii | H04N 23/90 |
| 2021/0122294 | A1* | 4/2021 | Mandai | G06T 7/12 |
| 2021/0281732 | A1* | 9/2021 | Koizumi | G06T 5/92 |
| 2021/0343044 | A1* | 11/2021 | Lee | G06T 7/80 |
| 2023/0051270 | A1* | 2/2023 | Takemura | G06V 10/7515 |
| 2023/0094672 | A1* | 3/2023 | Miyashita | G06T 7/55 382/104 |
| 2025/0124691 | A1* | 4/2025 | Hatano | G01C 21/34 |
| 2025/0124722 | A1* | 4/2025 | Kim | G06V 10/44 |

FOREIGN PATENT DOCUMENTS

| | | |
|---|---|---|
| JP | 2015201680 A | 11/2015 |
| KR | 1240499 B1 * | 3/2013 |

* cited by examiner

FIG. 10

| 255 | 255 | 255 | 255 |
|---|---|---|---|
| 255 | 255 | 255 | 255 |
| 255 | 255 | 255 | 255 |
| 200 | 200 | 200 | 200 |
| 100 | 100 | 100 | 100 |
| 0 | 50 | 50 | 0 |
| 0 | 0 | 0 | 0 |
| 0 | 0 | 0 | 0 |

\*

| 1 | 2 | 1 |
|---|---|---|
| 0 | 0 | 0 |
| -1 | -2 | -1 |

=

| | | | |
|---|---|---|---|
| 0 | 0 | 0 | 0 |
| 165 | 220 | 220 | 165 |
| 310 | 930 | 930 | 310 |
| 550 | 700 | 700 | 550 |
| 300 | 400 | 400 | 300 |
| 50 | 100 | 100 | 50 |
| | | | |

VEHICLE AND METHOD OF CONTROLLING THE SAME

CROSS-REFERENCE TO RELATED APPLICATION

This application claims the benefit of Korean Patent Application No. 10-2022-0061399, filed on May 19, 2022 in the Korean Intellectual Property Office, the disclosure of which is incorporated herein by reference.

BACKGROUND

1. Field

The present disclosure relates to a vehicle and a method of controlling the same, and more specifically, to a vehicle equipped with a camera configured to perform spatial recognition, and a method of controlling the same.

2. Discussion of the Background

A surround view monitor (SVM) function may provide a synthesized image to a driver after capturing front, rear, left, and right side images through a plurality of (e.g. four) cameras mounted on a vehicle and synthesizing images captured by the cameras or used to recognize a space in a remote smart parking assist (RSPA).

A left camera and a right camera among the cameras may have a downward field of view in a state of being buried in lower ends of side mirrors, and images of all of the vehicle itself and other spaces may be captured by the left camera or the right camera. In addition, a vignette phenomenon (e.g., a reduction of an image's brightness or saturation toward the periphery compared to the image center) may occur in the images captured by the left camera and the right camera due to the characteristics of the field of view.

In order to prevent degradation of spatial recognition performance due to the vignette phenomenon, a method of setting a region other than an actual space to a mask region may be used, but the set mask region may be changed by an operation of the side mirrors or an external physical impact, thereby degrading performance of recognizing a space and an object in the corresponding region.

Descriptions in this background section are provided to enhance understanding of the background of the disclosure, and may include descriptions other than those of the prior art already known to those of ordinary skill in the art to which this technology belongs.

SUMMARY

The following summary presents a simplified summary of certain features. The summary is not an extensive overview and is not intended to identify key or critical elements.

It is an aspect of the present disclosure to provide a vehicle capable of automatically resetting a mask region for preventing a vignette phenomenon and a method of controlling the vehicle.

Additional aspects of the disclosure will be set forth in part in the description which follows and, in part, will be obvious from the description, or may be learned by practice of the disclosure.

A vehicle may comprise: an image capturing device associated with a side field of view of the vehicle and configured to acquire a plurality of images associated with the side field of view; and a controller configured to: receive the plurality of images; generate, based on accumulated edge values, a first map and generate, based on accumulated brightness difference values, a second map, wherein the accumulated edge values and the accumulated brightness difference values are obtained by processing the plurality of images; determine a boundary between a vehicle region and a detection region in the side field of view based on: at least one first value for at least one pixel of the first map; and at least one second value for at least one pixel of the second map; and determine, based on the determined boundary, a mask region of the side field of view.

The controller may be configured to: perform a blur processing on a partial region of each of the plurality of images; and generate, based on the plurality of images on which the blur processing has been performed, the first map and the second map.

The controller may be configured to: generate the first map in which an edge value for the at least one pixel of the first map is reflected by performing an edge detection on the plurality of images; and acquire, from the first map, coordinates of the at least one first value including coordinates of a white pixel.

The controller may be configured to: acquire, based on a first brightness value of a first image of the plurality of images and a second brightness value of a second image of the plurality of images, a brightness difference value for the at least one pixel of the second map; determine a pixel associated with a brightness difference value satisfying a threshold as a white pixel; determine a pixel associated with a brightness difference value not satisfying the threshold as a black pixel; and acquire, from the second map, coordinates of the at least one second value including coordinates of the white pixel and coordinates of the black pixel.

The controller may be configured to: perform a convolution processing along a y-axis on the brightness difference value for the at least one pixel of the second map, and generate the at least one second value by performing scaling on the brightness difference value for the at least one pixel of the second map.

The controller may be configured to generate the at least one first value by performing scaling on the edge value for the at least one pixel of the first map.

The controller may be configured to: determine the boundary further based on smoothness associated with pixels of the plurality of images; apply a first weight to the at least one first value to determine a first weighted value; apply a second weight to the at least one second value to determine a second weighted value; apply a third weight to the smoothness to determine weighted smoothness; and acquire saliency based on the first weighted value, the second weighted value, and the weighted smoothness.

The controller may be configured to: acquire a y-coordinate value having a highest saliency on an x-axis; and determine, based on the acquired y-coordinate value, the boundary.

The controller may be configured to: determine a region of interest (ROI) associated with a wheel in at least one of the plurality of images; and determine, based on a rotation degree of a steering wheel, the mask region by reflecting the ROI.

The controller may be configured to detect an object that is included in the detection region but not included in the mask region, and wherein the image capturing device is configured to capture the plurality of images when a speed of the vehicle is higher than a threshold.

A method of controlling a vehicle may comprise: acquiring, by an image capturing device, a plurality of images associated with a side field of view of the vehicle; receiving, by a controller, the plurality of images; generating, based on accumulated edge values, a first map and generating, based on accumulated brightness difference values, a second map, wherein the accumulated edge values and the accumulated brightness difference values are obtained by processing the plurality of images; determining a boundary between a vehicle region and a detection region in the side field of view based on: at least one first value for at least one pixel of the first map; and at least one second value for at least one pixel of the second map; and determining, based on the determined boundary, a mask region of the side field of view.

The generating of the first map and the second map may comprise: performing a blur processing on a partial region of each of the plurality of images; and generating, based on the plurality of images on which the blur processing has been performed, the first map and the second map.

The generating of the first map and the second map may comprise: generating the first map in which an edge value for the at least one pixel of the first map is reflected by performing an edge detection on the plurality of images; and acquiring, from the first map, coordinates of the at least one first value including coordinates of a white pixel.

The generating of the first map and the second map may comprise: acquiring, based on a first brightness value of a first image of the plurality of images and a second brightness value of a second image of the plurality of images, a brightness difference value for the at least one pixel of the second map; determining a pixel associated with a brightness difference value satisfying a threshold as a white pixel; determining a pixel associated with a brightness difference value not satisfying the threshold as a black pixel; and acquiring, from the second map, coordinates of the at least one second value including coordinates of the white pixel and coordinates of the black pixel.

The acquiring of the coordinates of the at least one second value may comprise: performing a convolution processing along a y-axis on the brightness difference value for the at least one pixel of the second map; and generating the at least one second value by performing scaling on the brightness difference value for the at least one pixel of the second map.

The acquiring of the coordinates of the at least one first value may comprise: generating the at least one first value by performing scaling on the edge value for the at least one pixel of the first map.

The method may further comprise applying a first weight to the at least one first value to determine a first weighted value; applying a second weight to the at least one second value to determine a second weighted value; applying a third weight to smoothness associated with pixels of the plurality of images to determine weighted smoothness; and acquiring saliency based on the first weighted value, the second weighted value, and the weighted smoothness, wherein the determining of the boundary is further based on the smoothness.

The determining of the boundary may comprise: acquiring a y-coordinate value having a highest saliency on an x-axis; and determining, based on the acquired y-coordinate value, the boundary.

The determining of the mask region may comprise: determining a region of interest (ROI) associated with a wheel in at least one of the plurality of images; and determining, based on a rotation degree of a steering wheel, the mask region by reflecting the ROI.

The method may further comprise detecting an object that is included in the detection region but not included in the mask region, wherein the plurality of images are captured by the image capturing device when a speed of the vehicle is higher than a threshold.

These and other features and advantages are described in greater detail below.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 10 is a view referenced in the description of FIG. 9;

DETAILED DESCRIPTION

Figure 1:
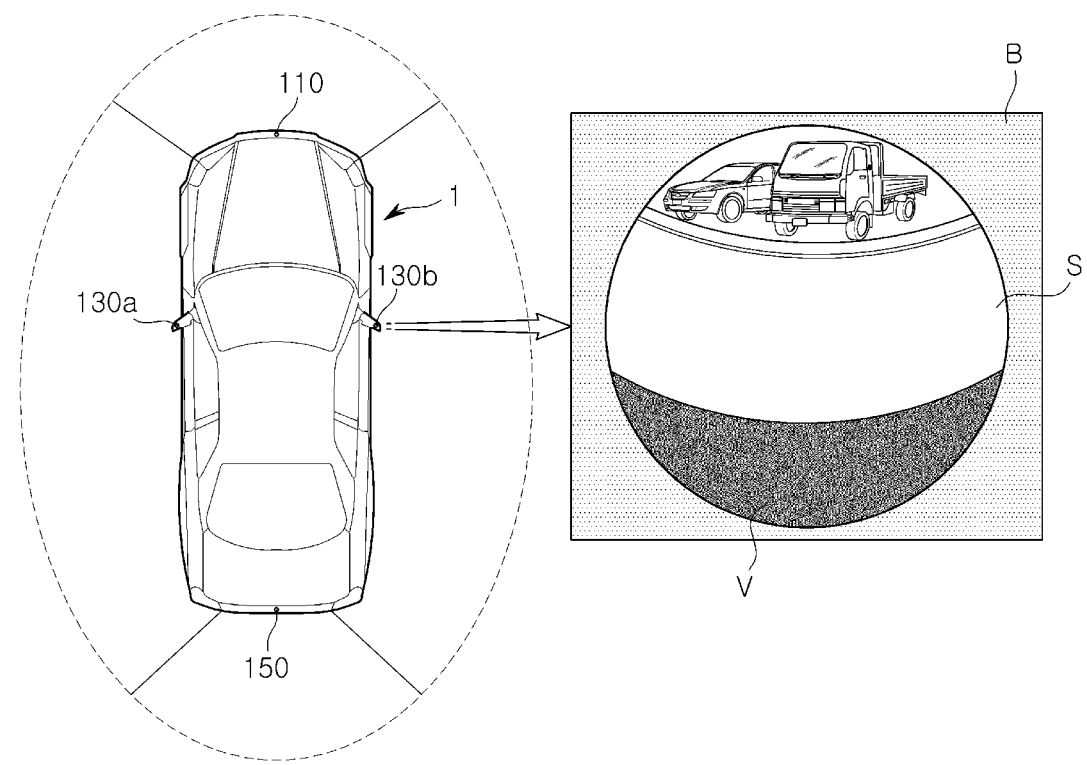
FIG. 1 shows a detection region and a field of view of a camera included in a vehicle.

The same reference numerals refer to the same components throughout the specification. The specification does not describe all elements of the examples described herein, and general contents in the art to which the present disclosure pertains or overlapping contents among the illustrated examples will be omitted. Terms "unit, module, member, and block" used in the specification may be implemented in software and/or hardware, and a plurality of "units, modules, members, and blocks" may be implemented as one component or one "unit, module, member, and block" may also include a plurality of components.

Throughout the specification, when a certain portion is described as being "connected" to another portion, it includes not only a case in which the certain portion is directly connected to another portion but also a case in which it is indirectly connected thereto, and the indirect connection includes a connection through a wireless communication network.

In addition, if a certain portion is described as "including" a certain component, it means that other components may be further included, rather than excluding the other components unless otherwise stated.

Throughout the specification, if a certain member is described as being positioned "on" another member, this includes not only a case in which one member comes into contact with another member but also a case in which other members are present between the two members.

Terms such as first and second are used to distinguish one component from another, and the components are not limited by the above-described terms.

The singular expression includes the plural expression unless the context clearly dictates otherwise.

In each operation, identification signs are used for convenience of description, and the identification signs do not describe the order of each operation, and each operation may be performed differently from the specified order unless the context clearly states the specific order.

Hereinafter, an operating principle and various examples of the present disclosure will be described with reference to the accompanying drawings.

Figure 2:
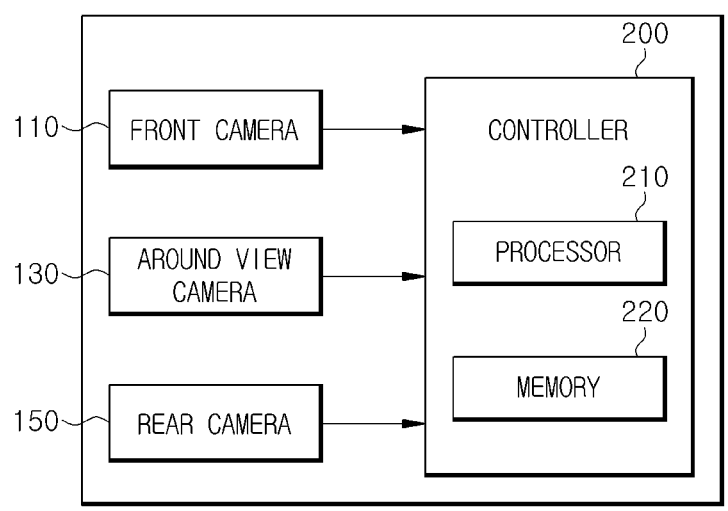
FIG. 2 is a control block diagram of a vehicle.

FIG. 1 shows an arrangement of a plurality of cameras included in a vehicle, and FIG. 2 is a control block diagram of a vehicle (e.g., the vehicle shown in FIG. 1 or any other vehicles).

A vehicle 1 may assist a driver to operate (e.g., driving, braking, and steering) the vehicle 1. For example, the vehicle 1 may detect surrounding environments (e.g., other vehicles, pedestrians, cyclists, lane lines, and road signs) and control the driving, braking, and/or steering of the vehicle 1 in response to the detected environments. Hereinafter, objects include all other vehicles, cyclists, and the like, which may be objects which may collide with the traveling vehicle 1 among the surrounding environments.

The vehicle 1 may provide various functions to the driver. For example, in order to provide an advanced driver assistance system or an autonomous traveling system, the vehicle 1 may provide a lane departure warning (LDW), a lane keeping assist (LKA), a high beam assist (HBA), an autonomous emergency braking (AEB), a traffic sign recognition (TSR), a smart cruise control (SCC), a blind spot detection (BSD), a surround view monitor (SVM), a remote smart parking assist (RSPA), and the like.

In order to provide various functions described above, as shown in FIG. 1, cameras may be provided at various positions of the vehicle 1. Although not shown in FIG. 1, the vehicle 1 may be provided with a radar and a light wave detection and/or ranging (LiDAR) device in addition to one or more cameras in order to perform the above-described functions.

The vehicle 1 may be provided with a front camera 110, side cameras 130 (130a and 130b), and a rear camera 150.

The front camera 110 may be installed on a front side (e.g., a front windshield) of the vehicle 1 to secure a front field of view. The front camera 110 may capture a front view of the vehicle 1 and acquire image data of the front view of the vehicle 1. The front camera 110 may detect an object moving in the front field of view or an object traveling in an adjacent lane in the front lateral field of view. The image data in the front view of the vehicle 1 may include position information on at least one of other vehicles, pedestrians, cyclists, lane lines, curbs, guard rails, street trees, and street lights positioned in front of the vehicle 1.

Around view cameras 130 (130a and 130b) may be installed in side mirrors (not shown) of the vehicle 1 to secure a downward field of view of the vehicle 1. The around view camera 130 may capture a lower side view of the vehicle 1 and acquire image data of the lower side view of the vehicle 1.

The rear camera 150 may be installed on a rear side of the vehicle 1, such as a rear bumper, to secure a rearward field of view of the vehicle 1. The rear camera 150 may capture a rear view of the vehicle 1 and acquire image data of a view behind the vehicle 1.

Referring to FIG. 2, a controller 200 may include an image signal processor which is a processor 210 configured to process the image data of the front camera 110, the around view camera 130, and the rear camera 150 and/or a micro control unit (MCU) configured to generate a steering signal and a braking signal.

Based on received image information (e.g., image data), the controller 200 may recognize an object and a lane line (e.g., lane markings) on a road by performing an image processing and control autonomous driving/traveling based on the recognized information.

A memory 220 may include a program and/or data for processing the image data, a program and/or data for processing radar data, and a program and/or data for the processor 210 to generate the braking signal and/or a warning signal.

The memory 220 may (e.g., temporarily) store the image data received from the front camera 110, the around view camera 130, and/or the rear camera 150 and temporarily store the processing result of the image data in the memory 220.

The memory 220 may be implemented as at least one of non-volatile memory devices, such as a cache, a read only memory (ROM), a programmable ROM (PROM), an erasable programmable ROM (EPROM), an electrically erasable programmable ROM (EEPROM), and a flash memory, volatile memory devices, such as a random access memory (RAM), and storage media, such as a hard disk drive (HDD) and a compact disc read-only memory (CD-ROM), but the present disclosure is not limited thereto.

The cameras 110, 130, and 150 may acquire the image data and provide images to the controller 200. As an example, the image acquired from the field of view of the around view camera 130 (e.g., the camera 130b) is as shown in FIG. 1.

Referring to FIG. 1, a vignette phenomenon occurs in the image due to the characteristics of the field of view and thus the image may be divided into a vignette region B, a vehicle region V which is a portion covered by the vehicle 1, and a detection region S where other objects may be detected. In the vehicle 1, a region required for autonomous traveling or autonomous parking corresponds to the detection region S, and the vehicle region V and the vignette region B may degrade performance of recognizing an external space. Therefore, the vehicle 1 can prevent degradation of spatial recognition performance by setting a region other than the detection region S as a mask region. In this case, the detection region S and the mask region may be divided by a boundary.

Figure 3:
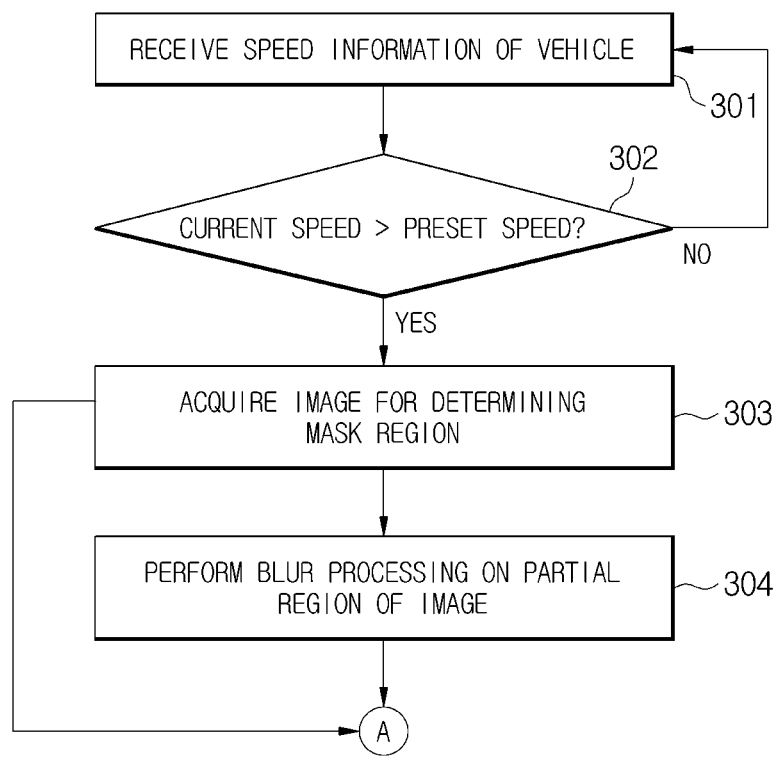
FIG. 3 is a flowchart of image preprocessing for determining a mask region.

FIG. 3 is a flowchart of image preprocessing for determining the mask region.

The controller 200 (e.g., the controller 200 shown in FIG. 2 or any other controllers) may receive speed information of the vehicle 1 (301). The controller 200 may acquire an image for determining the mask region (303), for example, if a current speed of the vehicle 1 is a preset speed or higher (302).

The mask region may be a region distinguished from the detection region where movement of the object and a change in the space are detected and may be subjected to the process according to the disclosure, for example, if a degree of change is ensured. Therefore, the vehicle 1 may check the speed of the vehicle 1 through a controller area network (CAN) signal while traveling and perform a logic for determining the mask region, for example, if the speed is a certain value or higher. A preset speed may be 40 km/h or any other speed. While the vehicle 1 is traveling, a change in the image occurs, and a plurality of images may be acquired to perform comparison therebetween for each image frame.

An additional condition in operation 303 may include that the vehicle 1 straightly travels in a state in which an operation of a steering wheel is not detected.

The controller 200 may perform a blur processing on a partial region of the image (304). The controller 200 may perform the blur processing on a partial region of the image to remove a detected edge or a brightness difference value caused by a curvature of a road surface and/or light reflection and generate a first map and a second map based on a plurality of images on which the blur processing has been performed. The first map and the second map will be described below as an edge map and a differential map (hereinafter, a diff map), respectively. The edge map and the diff map will be further explained below.

Based on the plurality of images acquired by the controller 200, the controller 200 may generate the edge map and the diff map based on the plurality of images. The edge map will be described with reference to FIGS. 4 to 6.

Figure 4:
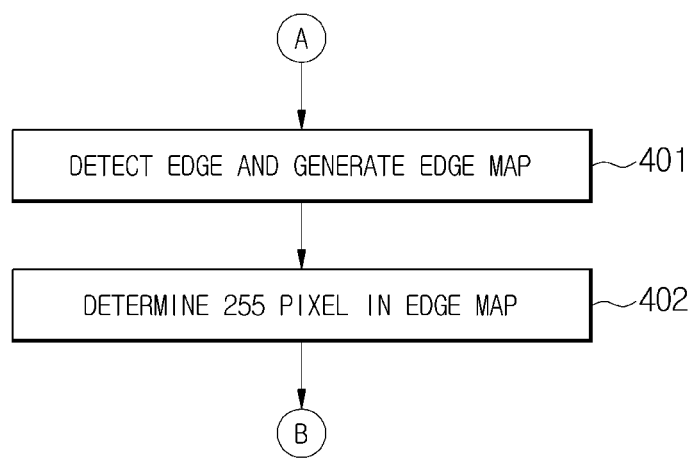
FIG. 4 is a flowchart of a process of generating an edge map for an image.
Figure 5:
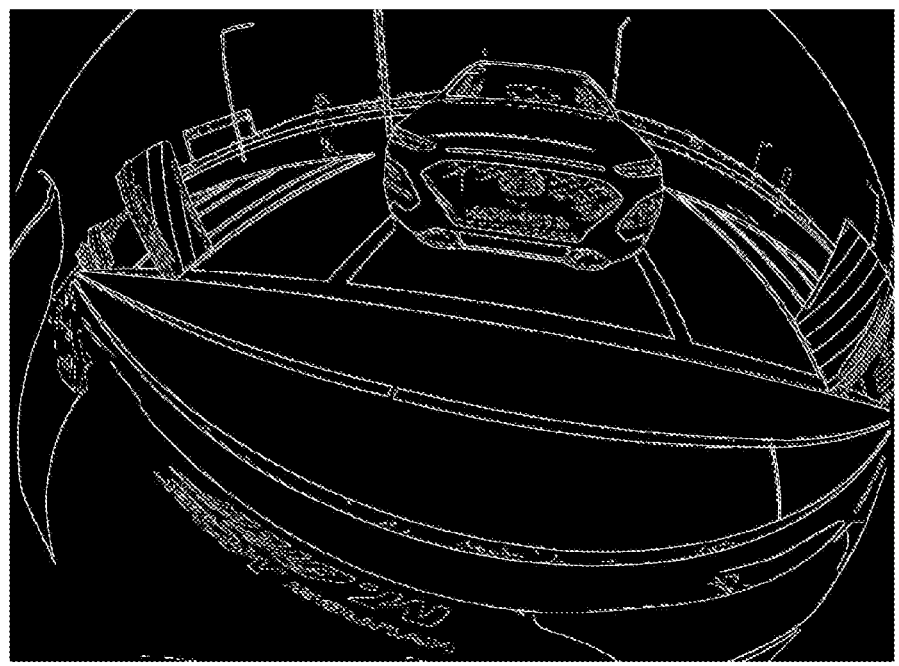
FIG. 5 is a view referenced in the description of FIG. 4.
Figure 6:
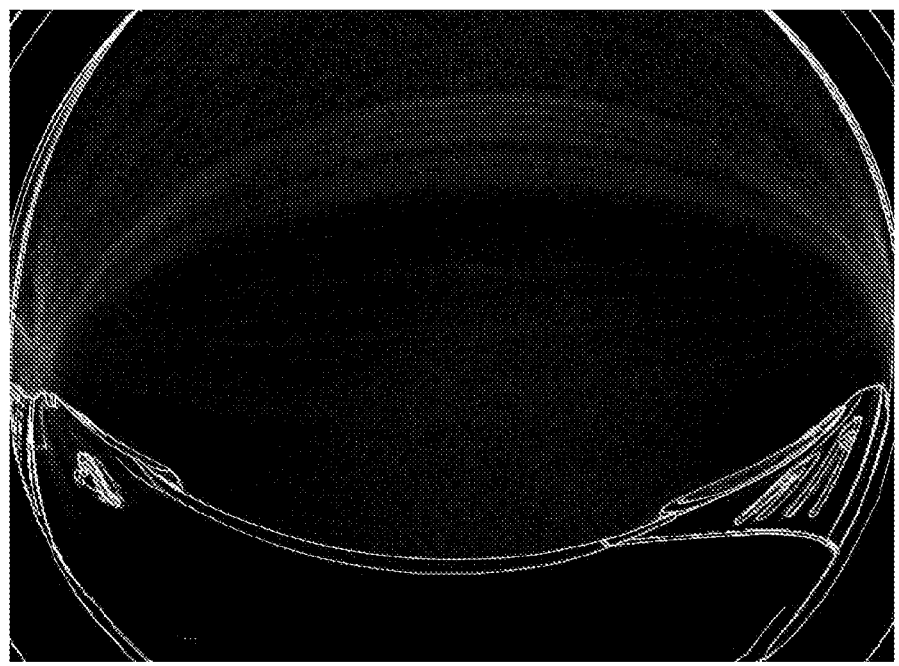
FIG. 6 is a view referenced in the description of FIG. 4.

FIG. 4 is a flowchart of a process of generating the edge map for the image, and FIGS. 5 and 6 are views referenced in the description of FIG. 4.

The controller 200 may detect edges from the plurality of images and accumulates edge values to generate the edge map (401). Here, the edge refers to a portion of the image(s) in which brightness is rapidly changed and refers to a boundary line or a contour line. Often, one of the factors which makes a corner recognizable is the edge.

Edge detection is a process of finding a pixel corresponding to the edge. The boundary line or the contour line in the image(s) is usually present at discontinuities of pixel values or discontinuities of pixel differential values. Since the edge refers to a place where there is a lot of difference in the pixel values, such as a discontinuous region of the pixel values, the concept of differential calculation for measuring the amount of spatial variation may be used to detect the edge. In this case, the edge value may be a gradient intensity level, and the gradient intensity level is between 0 and 255 and is not uniform. The edge of the final result has the same intensity (e.g., a white pixel=255).

The edge map may be generated by assigning an edge value for each coordinate based on the image(s). The controller 200 may determine a pixel having the edge value of a white pixel (e.g., 255) in the edge map.

The controller 200 may generate the edge map in which the edge value for each pixel is reflected by performing the edge detection on the plurality of images and acquire coordinate values of accumulated values including the white pixel (=255) from the generated edge map.

The controller 200 may perform scaling on the edge value.

Referring to FIG. 5, image data in which the edge is detected on one image may be checked while the vehicle travels straight. Here, the edge map shown in FIG. 6 may be derived by accumulating the detected edge values for each image frame.

Since a position of the region other than a region of the vehicle 1 while traveling is changed, a position of the edge is changed, whereas since a position of the vehicle region V (see FIG. 1) on the image is fixed and thus the edges at the same position are accumulated (e.g., in a plurality of captured images), a position of a pixel having a lot of the initially accumulated edges is highly likely to be the boundary of the vehicle 1. Additionally, in order to improve the edge, it may be determined that the edge value of a pixel having the accumulated edge value of a threshold or more may be the white pixel value (e.g., 255 or any other suitable value).

Figure 7:
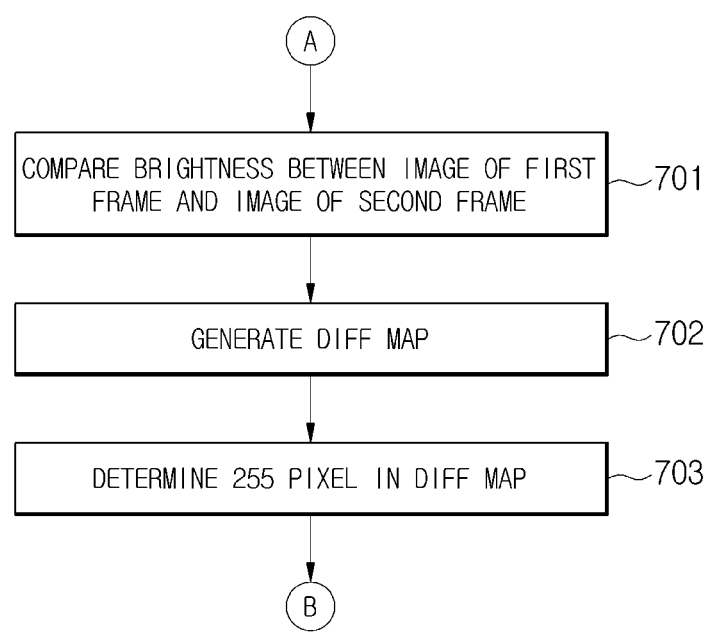
FIG. 7 is a flowchart showing a process of generating a diff map on the image.
Figure 8:
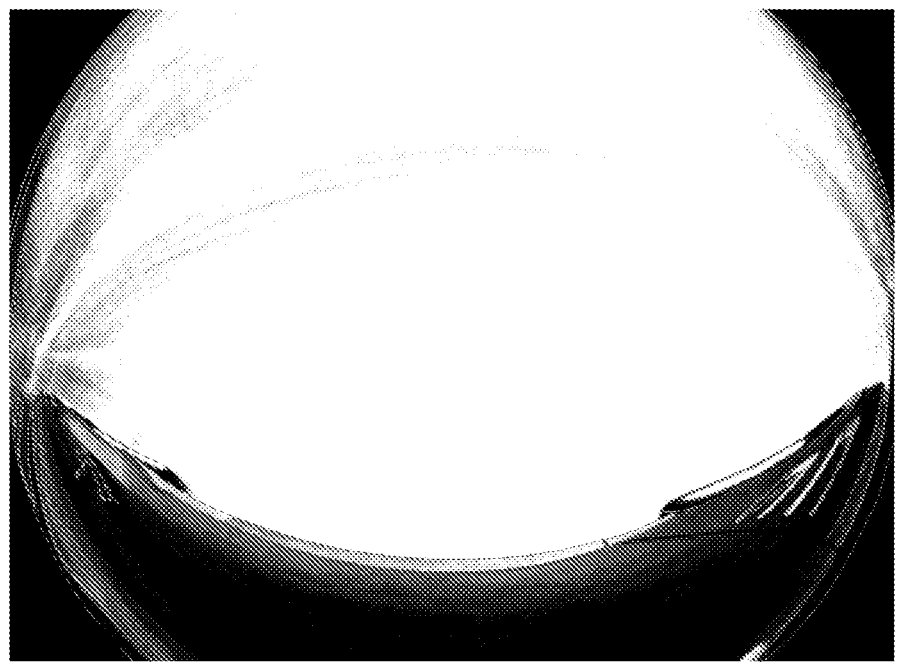
FIG. 8 is a view referenced in the description of FIG. 7.

FIG. 7 is a flowchart of a process of generating the diff map on the image, and FIG. 8 is a view referenced in the description of FIG. 7.

The controller 200 may compare brightness (e.g., brightness values) between an image of a first frame and an image of a second frame (701) and generate the diff map by accumulating brightness difference values for each pixel (702). Here, the first frame and the second frame refer to previous and subsequent images over time while the vehicle travels.

The controller 200 may determine a pixel having the brightness value of the white pixel (e.g., 255) from the diff map to determine the boundary for dividing the mask region (703).

In an example, the controller 200 may generate the diff map by accumulating the brightness difference values of previous and subsequent frames while the vehicle 1 travels straight. At this time, the diff map may be generated together with the edge map. Here, the change in the brightness difference between the previous and subsequent frames may be small in the vehicle region V (see FIG. 1), and the change in the brightness difference between the previous and subsequent frames in the detection region S (see FIG. 1) may be relatively large.

If a brightness difference value between the previous and subsequent frames satisfies a threshold difference value or more, the controller 200 may add a constant to the accumulated value of the brightness difference values. At this time, if the accumulated value obtained by adding the constant is an average brightness difference value or more, it may be determined that the accumulated value of a pixel in the diff map is a value of a white pixel (e.g., 255).

If the brightness difference value between the previous and subsequent frames is smaller than the threshold difference value, the controller 200 may subtract the constant from the accumulated value of the brightness difference values. At this time, if the accumulated value obtained by subtracting the constant is smaller than the average brightness difference value, it may be determined that the accumulated value of a pixel in the diff map is a value of a black pixel (e.g., 0).

Reflecting the constant in the above description is to perform compensation for temporary backlight.

The controller 200 may acquire the brightness difference values for each pixel between previous and subsequent images from the plurality of images, determine a pixel having the brightness difference value of the threshold or more as a white pixel, and determine a pixel having the brightness difference value smaller than the threshold as a black pixel. The controller 200 may acquire coordinates of a second accumulated value including the white pixel and the black pixel in the diff map.

Referring to FIG. 8, an image having the accumulated brightness difference value may be checked.

The processes of generating the edge map and the diff map are described above. Hereinafter, a process of determining a final mask image by additionally reflecting a smoothness of the image will be described.

Figure 9:
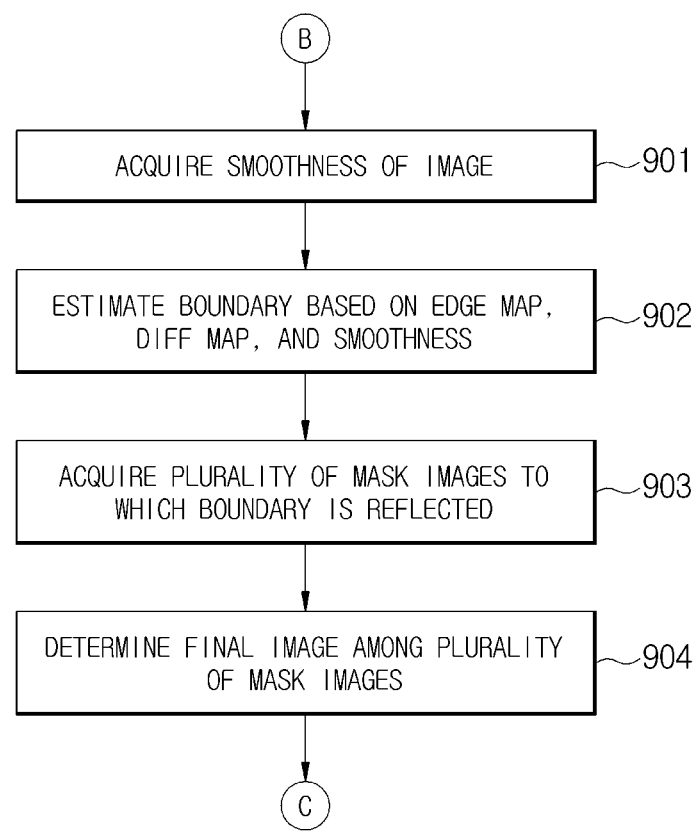
FIG. 9 is a flowchart of a process of determining a final mask image.
Figure 11:
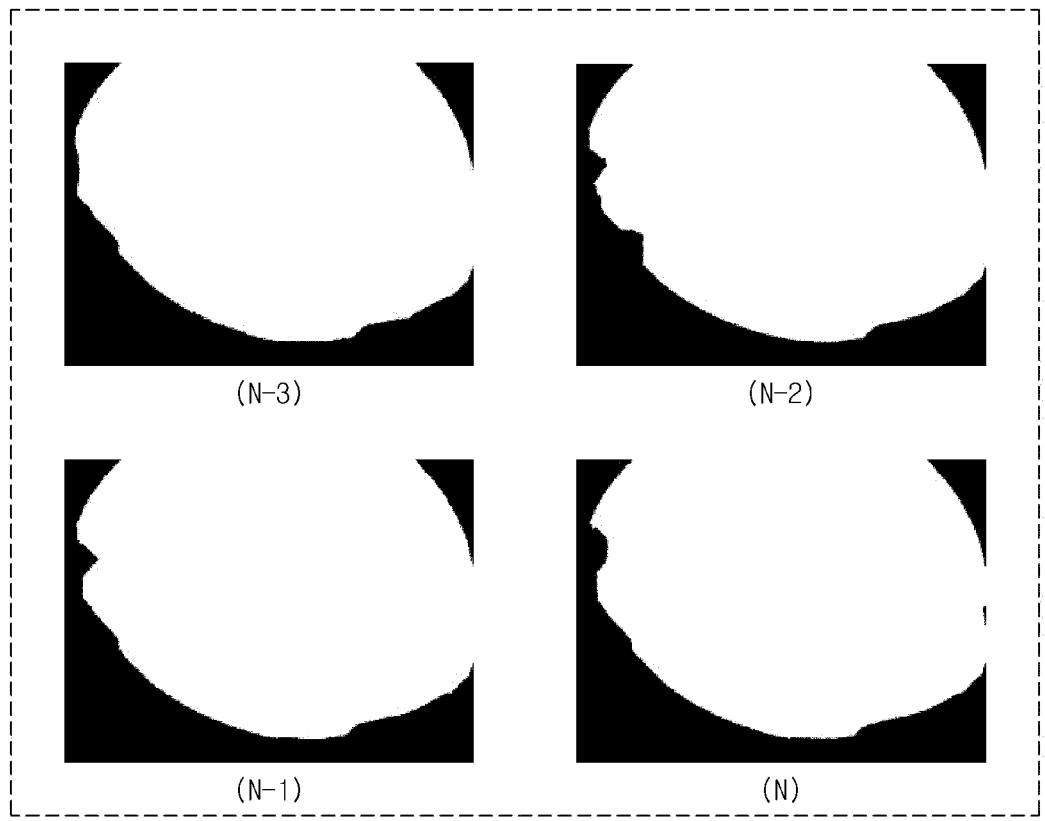
FIG. 11 is a view referenced in the description of FIG. 9.
Figure 11:
Figure 11:
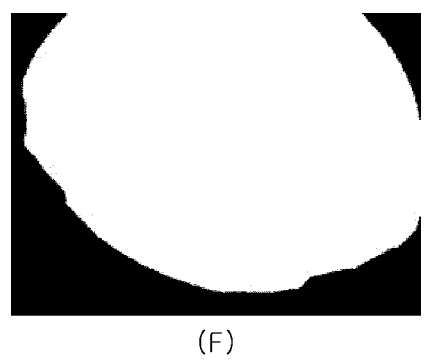

FIG. 9 is a flowchart of the process of determining the final mask image, and FIGS. 10 and 11 are views referenced in the description of FIG. 9.

The controller 200 may acquire the smoothness of the image. The smoothness is a statistical scheme for selecting pixels with relatively less noise in an image fusion.

As for the smoothness, by coordinating the pixels of the image, if the relationship of estimatedMaskPointY[x−1]=y is established for each coordinate when x>0, the smoothness may be determined as 1, and if the relationship of estimatedMaskPointY[x−1]=y is not established for each coordinate when x>0, the smoothness may be determined as 1/abs(estimatedMaskPointY[x−1]−y). Here, estimatedMaskPointY indicates an estimated boundary. The smoothness reflects the assumption that since the boundary line between the vehicle 1 and the detection region S (see FIG. 1) is continuous, a boundary of a host vehicle will appear in a y-coordinate similar to a boundary of the host vehicle in (x−1).

The controller 200 may estimate a boundary using the edge map, the diff map, and/or the smoothness (902) and may acquire a plurality of mask images reflecting the boundary (903). The mask image is an image in which the mask region is reflected to the image and is one of candidates for determining the final mask image among the plurality of mask images by continuously performing the above-described logic. Referring to FIG. 10, if the plurality of mask images are acquired, a region below the estimated boundary may be regarded as the mask region, and a pixel having the smallest y value (a pixel position at the top) among the plurality of mask images may be determined as the final mask image.

The controller 200 may determine the final mask image among the plurality of images (904).

Referring to FIG. 10, the controller 200 may generate an accumulated value for the diff map by scaling a value subjected to convolution while scanning along the y-axis using a 3×3 filter in the diff map. If the 3×3 filter shown in FIG. 10 is used, the brightness difference value may be relatively large in the boundary region where the value increases and then decreases on the Diff map, and this region is highly likely the boundary (see e.g., FIGS. 10, 550, 930, 930, and 550) between the vehicle region V and the detection region S.

The controller 200 may perform convolution on the brightness difference value along the y-axis and generate the second accumulated value by performing scaling on the brightness difference value subjected to the convolution.

If the accumulated value is large in the edge map, the controller 200 may simply perform the scaling because the region having the large accumulated value is highly likely to be the boundary line between the vehicle region V and the detection region S.

The controller 200 may apply a first weight to a first accumulated value for the edge map, apply a second weight to the second accumulated value for the diff map, and apply a third weight to the smoothness. The controller 200 may acquire saliency which may be the sum of the first accumulated value, the second accumulated value, and the smoothness to which each weight is applied. The controller 200 may determine the position of the pixel having the greatest saliency as the boundary. This is because a y-coordinate having the highest saliency within the same x-value may be determined as the boundary by comparing coordinates having the same x-value.

The controller 200 may acquire a y-coordinate value having the highest saliency on the x-axis and determine the boundary based on the acquired y-coordinate value.

When the speed of the vehicle 1 is a preset speed or higher, the controller 200 may receive the plurality of images for dividing the mask region for a side field of view of the around view camera 130. At this time, the controller 200 may generate the edge map in which the edge values are accumulated and the diff map in which the brightness difference values are accumulated by processing the plurality of images and acquire the smoothness for each pixel of the image. The controller 200 may determine the boundary based on the first accumulated value for each pixel of the edge map, the second accumulated value for each pixel of the diff map, and the smoothness for each pixel and determine the mask region based on the boundary.

The process of determining the mask region while the vehicle 1 travels straight is described above. The wheel of the vehicle 1 may be detected in the field of view of the around view camera 130 (see FIG. 1) when the steering wheel of the vehicle 1 is operated maximally (full left turn or full right turn) (see e.g., FIG. 16). In this case, it may be necessary to set a mask region different from the mask region while the vehicle travels straight.

Figure 12:
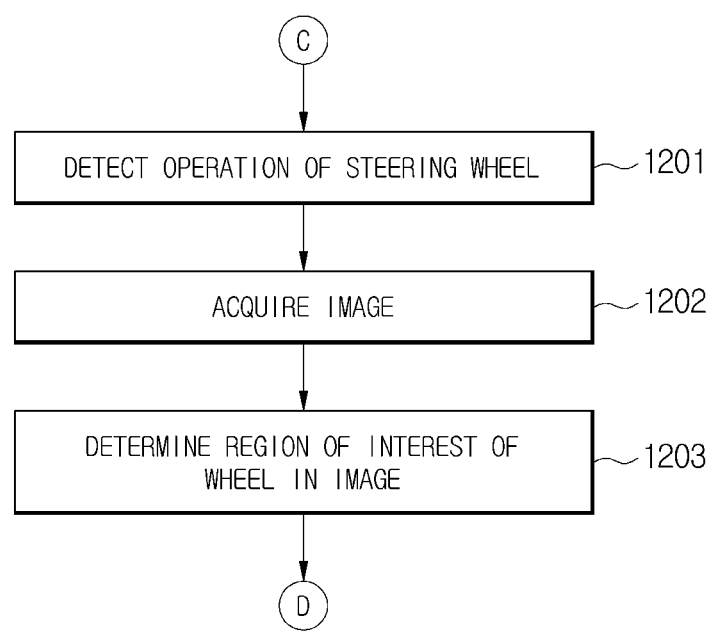
FIG. 12 is a flowchart showing a process of determining a region of interest (ROI) by a wheel in the image.
Figure 13:
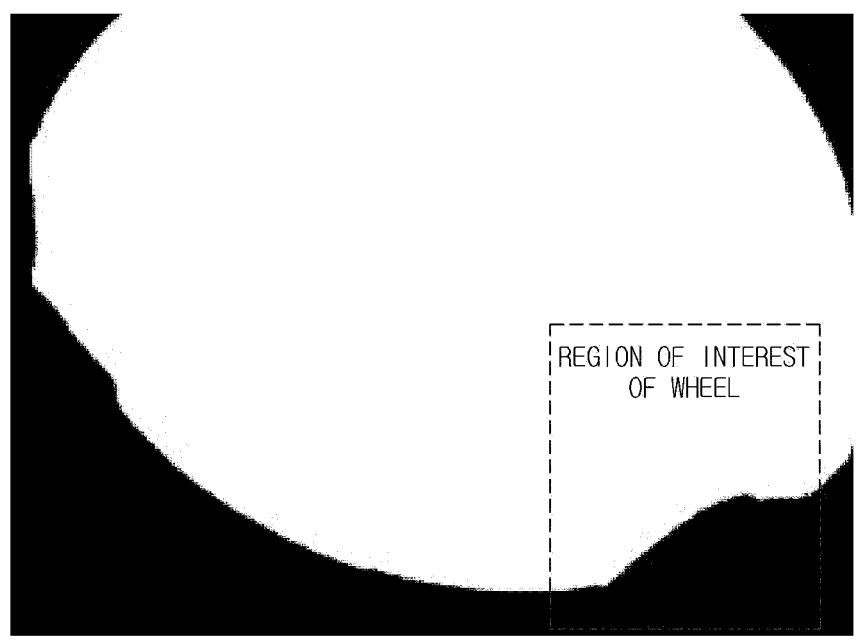
FIG. 13 is a view referenced in the description of FIG. 12.

FIG. 12 is a flowchart of a process of determining a region of interest (ROI) by a wheel in an image, and FIG. 13 is a view referenced in the description of FIG. 12.

The controller 200 may detect the operation of the steering wheel of the vehicle 1 (1201) and acquire the image for determining the mask region (1202). The controller 200 may acquire the image on condition that a degree of operation of the steering wheel is a maximum value to a left or right side. The vehicle 1 may acquire the degree of operation of the steering wheel through a controller area network (CAN) signal while traveling.

Based on the acquired image, the controller 200 may determine an ROI of the wheel in the image (1203). The ROI of the wheel may correspond to a region in the image where the wheel is detected.

The controller 200 may determine a boundary for the ROI and determine the mask region by performing the process shown in FIGS. 4, 7, and 9.

Since there are few cases in which the steering angle is large while the vehicle travels, the mask region may be determined by acquiring only one mask image without acquiring a plurality of mask images. The mask region may be determined by partially performing the image processing on only the ROI of the wheel described above.

Figure 14:
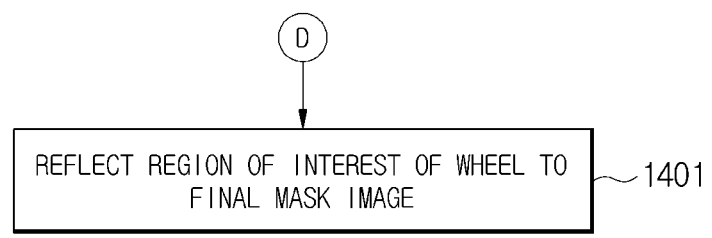
FIG. 14 is a final flowchart of a method of controlling the vehicle.
Figure 15:
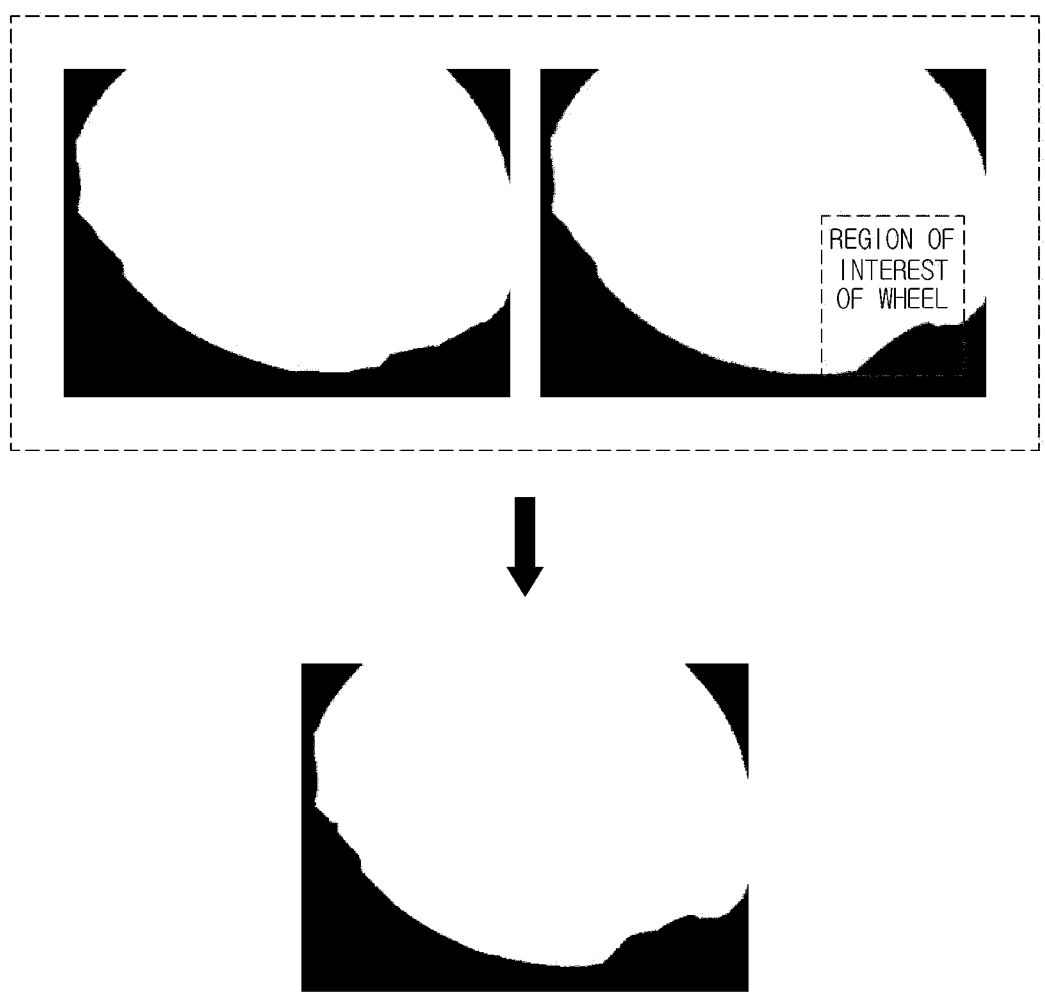
FIG. 15 is a view referenced in the description of FIG. 14.
Figure 16:
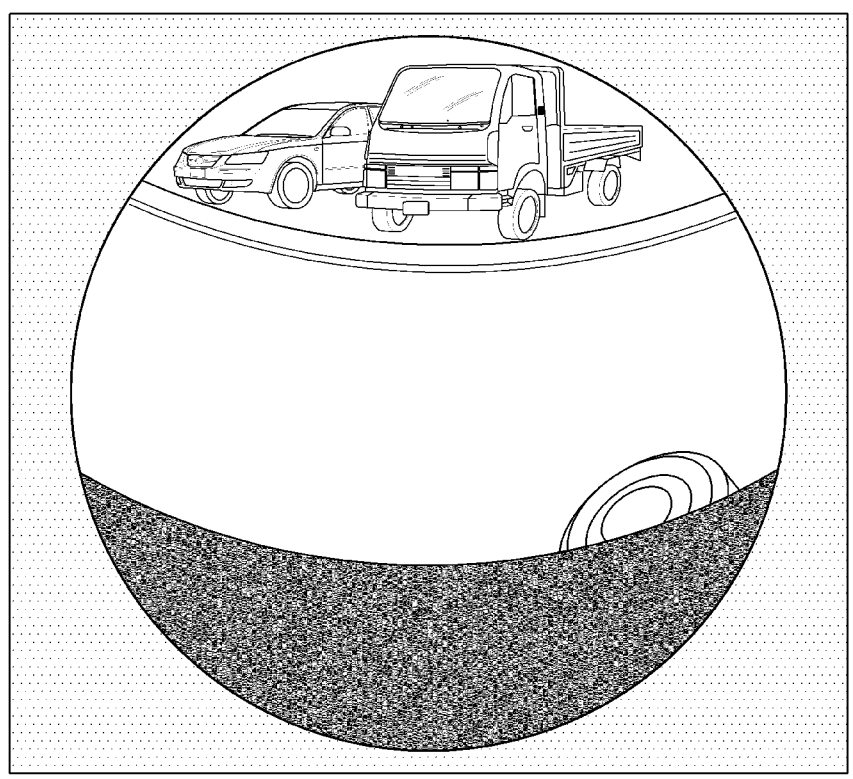
FIG. 16 is a view referenced in the description of FIG. 14.

FIG. 14 is a flowchart of a method of controlling the vehicle, and FIGS. 15 and 16 are views referenced in the description of FIG. 14.

The controller 200 may reflect the ROI of the wheel to the final mask image (1401). As shown in FIG. 15, the final mask image to which the ROI of the wheel is reflected may be generated.

The vehicle 1 may detect the object in the detection region S except for the mask region in the side field of view. If the remote smart parking assist (RSPA) is operated, the vehicle 1 may recognize a space through an image to which the mask region is applied and detect an object.

According to a traveling state of the vehicle 1, the controller 200 may use the mask region to which the ROI of the wheel is not reflected in the process of detecting the object while the vehicle straightly travels and use the mask region to which the ROI of the wheel is reflected in the process of detecting the object while the vehicle travels by maximally operating the steering wheel.

In accordance with an aspect of the present disclosure, a vehicle includes a camera installed in a vehicle to have a side field of view of the vehicle and configured to acquire an image for detecting an object from the side field of view and a controller configured to receive a plurality of images for distinguishing a mask region of the side field of view, generate a first map in which edge values are accumulated and a second map in which brightness difference values are accumulated by processing the plurality of images, acquire smoothness for each pixel of the images, determine a boundary between the vehicle and a detection region in the side field of view of the camera based on a first accumulated value for each pixel of the first map, a second accumulated value for each pixel of the second map, and the smoothness, and determine the mask region based on the determined boundary when a speed of the vehicle is a preset speed or higher.

The controller may perform blur processing on a partial region of each of the images, and generate the first map and the second map based on the plurality of images on which the blur processing has been performed.

The controller may generate the first map in which an edge value for each pixel is reflected by performing edge detection on the plurality of images, and acquire coordinates of the first accumulated value including a white pixel from the first map.

The controller may acquire a brightness difference value for each pixel between previous and subsequent images from the plurality of images, determine a pixel having the brightness difference value of a threshold or more as the white pixel, determine a pixel having the brightness difference value smaller than the threshold as a black pixel, and acquire coordinates of the second accumulated value including the white pixel and the black pixel from the second map.

The controller may perform convolution along a y-axis on the brightness difference value, and generate the second accumulated value by performing scaling on the brightness difference value subjected to the convolution.

The controller may generate the first accumulated value by performing scaling on the edge value.

The controller may apply a first weight to the first accumulated value, apply a second weight to the second accumulated value, apply a third weight to the smoothness, and acquire saliency which is the sum of the first accumulated value, the second accumulated value, and the smoothness to which each weight is applied.

The controller may acquire a y coordinate value having a highest saliency on an x-axis, and determine the boundary based on the acquired y coordinate value.

The controller may determine a region of interest (ROI) of a wheel in the image, and determine the mask region by reflecting the ROI when a maximum operation of a steering wheel is detected.

The controller may detect the object in the detection region except for the mask region in the side field of view.

In accordance with another aspect of the present disclosure, a method of controlling a vehicle includes acquiring an image for detecting an object in a side field of view, receiving a plurality of images for distinguishing a mask region of the side field of view when a speed of the vehicle is a preset speed or higher, generating a first map in which edge values are accumulated and a second map in which brightness difference values are accumulated by processing the plurality of images, acquiring smoothness for each pixel of the image, determining a boundary between the vehicle and a detection region in a side field of view of a camera based on a first accumulated value for each pixel of the first map, a second accumulated value for each pixel of the second map, and the smoothness, and determining the mask region based on the determined boundary.

The generating of the first map and the second map may include performing blur processing on a partial region of each of the images, and generating the first map and the second map based on the plurality of images on which the blur processing has been performed.

The generating of the first map and the second map may include generating the first map in which an edge value for each pixel is reflected by performing edge detection on the plurality of images, and acquiring coordinates of the first accumulated value including a white pixel from the first map.

The generating of the first map and the second map may include acquiring a brightness difference value for each pixel between previous and subsequent images from the plurality of images, determining a pixel having the brightness difference value of a threshold or more as the white pixel, determining a pixel having the brightness difference value smaller than the threshold as a black pixel, and acquiring coordinates of the second accumulated value including the white pixel and the black pixel from the second map.

The acquiring of the coordinates of the second accumulated value may include performing convolution along a y-axis on the brightness difference value, and generating the second accumulated value by performing scaling on the brightness difference value subjected to the convolution.

The acquiring of the coordinates of the first accumulated value may include generating the first accumulated value by performing scaling on the edge value.

The method according to another aspect may further include applying a first weight to the first accumulated value, applying a second weight to the second accumulated value, applying a third weight to the smoothness, and acquiring saliency which is the sum of the first accumulated value, the second accumulated value, and the smoothness to which each weight is applied.

The determining of the boundary may include acquiring a y coordinate value having a highest saliency on an x-axis, and determining the boundary based on the acquired y coordinate value.

The determining of the mask region may include determining a region of interest (ROI) of a wheel in the image, and determining the mask region by reflecting the ROI when a maximum operation of a steering wheel is detected.

The method according to another aspect may further include detecting the object in the detection region except for the mask region in the side field of view.

The features described herein may be implemented in the form of a recording medium configured to store instructions executable by a computer. The instructions may be stored in the form of program code and may perform the operations of the features by generating a program module when executed by a processor. The recording medium may be implemented as a computer-readable recording medium.

Computer-readable recording media includes all types of recording media in which the instructions readable by the computer are stored. For example, there may be a ROM, a RAM, a magnetic tape, a magnetic disc, a flash memory, an optical data storage device, and the like.

According to an aspect of the disclosed disclosure, it is possible to improve spatial recognition performance by automatically resetting a mask region corresponding to vignetting of a camera. In addition, it is possible to prevent degradation of the spatial recognition performance by automatically resetting the mask region even when a field of view of the camera is changed due to external factors.

Various examples have been described with reference to the accompanying drawings as described above. Those skilled in the art to which the present disclosure pertains will understand that the present disclosure may be carried out in other forms than the illustrated examples without changing the technical spirit or essential characteristics of the present disclosure. The disclosed embodiments are illustrative and should not be construed as being restrictive.

What is claimed is:

1. A vehicle comprising:
   a sensor associated with a side field of view of the vehicle and configured to acquire a plurality of images associated with the side field of view; and
   a controller configured to:
   receive the plurality of images;
   generate, based on accumulated edge values, a first map and generate, based on accumulated brightness difference values, a second map, wherein the accumulated edge values and the accumulated brightness difference values are obtained by processing the plurality of images;
   determine a boundary between a vehicle region and a detection region in the side field of view based on:
   at least one first value for at least one pixel of the first map; and
   at least one second value for at least one pixel of the second map;
   determine, based on the determined boundary, a mask region of the side field of view; and
   control, based on an image applied with the mask region, autonomous driving of the vehicle.

2. The vehicle of claim 1, wherein the controller is configured to:
   perform a blur processing on a partial region of each of the plurality of images; and
   generate, based on the plurality of images on which the blur processing has been performed, the first map and the second map.

3. The vehicle of claim 1, wherein the controller is configured to:
   generate the first map in which an edge value for the at least one pixel of the first map is reflected by performing an edge detection on the plurality of images; and
   acquire, from the first map, coordinates of the at least one first value including coordinates of a white pixel.

4. The vehicle of claim 1, wherein the controller is configured to:
   acquire, based on a first brightness value of a first image of the plurality of images and a second brightness value of a second image of the plurality of images, a brightness difference value for the at least one pixel of the second map;
   determine a pixel associated with a brightness difference value satisfying a threshold as a white pixel;
   determine a pixel associated with a brightness difference value not satisfying the threshold as a black pixel; and
   acquire, from the second map, coordinates of the at least one second value including coordinates of the white pixel and coordinates of the black pixel.

5. The vehicle of claim 4, wherein the controller is configured to:
   perform a convolution processing along a y-axis on the brightness difference value for the at least one pixel of the second map, and
   generate the at least one second value by performing scaling on the brightness difference value for the at least one pixel of the second map.

6. The vehicle of claim 3, wherein the controller is configured to generate the at least one first value by performing scaling on the edge value for the at least one pixel of the first map.

7. The vehicle of claim 1, wherein the controller is configured to:
   determine the boundary further based on smoothness associated with pixels of the plurality of images;
   apply a first weight to the at least one first value to determine a first weighted value;
   apply a second weight to the at least one second value to determine a second weighted value;
   apply a third weight to the smoothness to determine weighted smoothness; and
   acquire saliency based on the first weighted value, the second weighted value, and the weighted smoothness.

8. The vehicle of claim 1, wherein the controller is configured to:
   acquire a y-coordinate value having a highest saliency on an x-axis; and
   determine, based on the acquired y-coordinate value, the boundary.

9. The vehicle of claim 1, wherein the controller is configured to:
   determine a region of interest (ROI) associated with a wheel in at least one of the plurality of images; and
   determine, based on a rotation degree of a steering wheel, the mask region by reflecting the ROI.

10. The vehicle of claim 1, wherein the controller is configured to detect an object that is included in the detection region but not included in the mask region, and
    wherein the sensor is configured to capture the plurality of images when a speed of the vehicle is higher than a threshold.

11. A method of controlling a vehicle, comprising:
    acquiring, by a sensor of the vehicle, a plurality of images associated with a side field of view of the vehicle;
    receiving, by a controller, the plurality of images;
    generating, based on accumulated edge values, a first map and generating, based on accumulated brightness difference values, a second map, wherein the accumulated edge values and the accumulated brightness difference values are obtained by processing the plurality of images;
    determining a boundary between a vehicle region and a detection region in the side field of view based on:
    at least one first value for at least one pixel of the first map; and
    at least one second value for at least one pixel of the second map;
    determining, based on the determined boundary, a mask region of the side field of view; and
    controlling, based on an image applied with the mask region, autonomous driving of the vehicle.

12. The method of claim 11, wherein the generating of the first map and the second map comprises:
    performing a blur processing on a partial region of each of the plurality of images; and
    generating, based on the plurality of images on which the blur processing has been performed, the first map and the second map.

13. The method of claim 11, wherein the generating of the first map and the second map comprises:
    generating the first map in which an edge value for the at least one pixel of the first map is reflected by performing an edge detection on the plurality of images; and
    acquiring, from the first map, coordinates of the at least one first value including coordinates of a white pixel.

14. The method of claim 11, wherein the generating of the first map and the second map comprises:
    acquiring, based on a first brightness value of a first image of the plurality of images and a second brightness value of a second image of the plurality of images, a brightness difference value for the at least one pixel of the second map;

determining a pixel associated with a brightness difference value satisfying a threshold as a white pixel;

determining a pixel associated with a brightness difference value not satisfying the threshold as a black pixel; and acquiring, from the second map, coordinates of the at least one second value including coordinates of the white pixel and coordinates of the black pixel.

15. The method of claim 13, wherein the acquiring of the coordinates of the at least one first value comprises:

generating the at least one first value by performing scaling on the edge value for the at least one pixel of the first map.

16. The method of claim 11, further comprising:

applying a first weight to the at least one first value to determine a first weighted value;

applying a second weight to the at least one second value to determine a second weighted value;

applying a third weight to smoothness associated with pixels of the plurality of images to determine weighted smoothness; and acquiring saliency based on the first weighted value, the second weighted value, and the weighted smoothness, wherein the determining of the boundary is further based on the smoothness.

17. The method of claim 11, wherein the determining of the boundary comprises:

acquiring a y-coordinate value having a highest saliency on an x-axis; and determining, based on the acquired y-coordinate value, the boundary.

18. The method of claim 11, wherein the determining of the mask region comprises:

determining a region of interest (ROI) associated with a wheel in at least one of the plurality of images; and determining, based on a rotation degree of a steering wheel, the mask region by reflecting the ROI.

19. The method of claim 11, further comprising:

detecting an object that is included in the detection region but not included in the mask region, wherein the plurality of images are captured by the sensor when a speed of the vehicle is higher than a threshold.

20. A vehicle comprising:

a sensor associated with a field of view of the vehicle and configured to acquire a plurality of images associated with the field of view; and a controller configured to:

receive the plurality of images;

generate, based on accumulated edge values, a first map and generate, based on accumulated brightness difference values, a second map, wherein the accumulated edge values and the accumulated brightness difference values are obtained by processing the plurality of images;

determine a boundary between a vehicle region and a detection region in the field of view based on the first map and the second map;

determine, based on the determined boundary, a mask region of the field of view; and control, based on an image associated with the detection region and associated with the mask region, a driving operation of the vehicle.

* * * * *